United States Patent
Behnen et al.

(10) Patent No.: US 10,331,640 B2
(45) Date of Patent: Jun. 25, 2019

(54) POPULATING TEXT INDEXES

(71) Applicant: International Business Machines Corporation, Armonk, NY (US)

(72) Inventors: Marion Behnen, Austin, TX (US); Randal J. Richardt, San Jose, CA (US); Phong K. Truong, San Jose, CA (US); Howard H. Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 14/304,786

(22) Filed: Jun. 13, 2014

(65) Prior Publication Data

US 2015/0363444 A1 Dec. 17, 2015

(51) Int. Cl.
| | | |
|---|---|---|
| G06F 16/30 | (2019.01) | |
| G06F 16/22 | (2019.01) | |
| G06F 16/31 | (2019.01) | |
| G06F 16/93 | (2019.01) | |
| G06F 16/27 | (2019.01) | |
| G06F 16/951 | (2019.01) | |
| G06F 16/23 | (2019.01) | |

(52) U.S. Cl.
CPC ...... *G06F 16/2228* (2019.01); *G06F 16/2322* (2019.01); *G06F 16/275* (2019.01); *G06F 16/31* (2019.01); *G06F 16/93* (2019.01); *G06F 16/951* (2019.01)

(58) Field of Classification Search
CPC ........ G06F 17/30321; G06F 17/30613; G06F 17/30011; G06F 17/30581; G06F 17/30353; G06F 17/30864; G06F 17/30
See application file for complete search history.

(56) References Cited

U.S. PATENT DOCUMENTS

| | | |
|---|---|---|
| 5,251,316 A | 10/1993 | Anick et al. |
| 7,082,427 B1 | 7/2006 | Seibel et al. |
| 7,424,510 B2 | 9/2008 | Gross et al. |
| 7,634,487 B2 | 12/2009 | Bae et al. |
| 8,082,258 B2 | 12/2011 | Kumar et al. |
| 8,380,701 B1 | 2/2013 | Konik et al. |
| 2005/0251526 A1 | 11/2005 | Nayak |
| 2008/0288473 A1* | 11/2008 | Hu .................. G06F 17/30522 |
| 2009/0164437 A1 | 6/2009 | Torbjornsen |
| 2009/0193406 A1 | 7/2009 | Williams |
| 2009/0228528 A1 | 9/2009 | Ercegovac et al. |

(Continued)

OTHER PUBLICATIONS

Mell, P. et al., "Effectively and Securely Using the Cloud Computing Paradigm", dated Oct. 7, 2009, National Institute of Standards and Technology (NIST), Information Technology Laboratory, Total 80 pages.

(Continued)

*Primary Examiner* — Kristopher Andersen
(74) *Attorney, Agent, or Firm* — Janaki K. Davda; Konrad, Raynes, Davda and Victor LLP

(57) ABSTRACT

Provided are techniques for populating a new text index. In response to determining that a limit for indexing a set of documents to the new text index has been reached, a commit is performed, a restart key is updated to identify a next document to be indexed, and the next document is indexed in a next commit cycle.

8 Claims, 17 Drawing Sheets

(56) References Cited

U.S. PATENT DOCUMENTS

| | | | |
|---|---|---|---|
| 2010/0064357 A1* | 3/2010 | Baird | G06F 8/30 |
| | | | 726/6 |
| 2010/0161569 A1* | 6/2010 | Schreter | G06F 17/30327 |
| | | | 707/696 |
| 2011/0219008 A1 | 9/2011 | Been et al. | |
| 2011/0225165 A1 | 9/2011 | Burstein | |
| 2012/0016881 A1* | 1/2012 | Hrle | G06F 17/30312 |
| | | | 707/746 |
| 2012/0059823 A1* | 3/2012 | Barber | G06F 17/30584 |
| | | | 707/737 |
| 2012/0078942 A1 | 3/2012 | Cai et al. | |
| 2012/0259824 A1 | 10/2012 | Zagelow et al. | |
| 2012/0278335 A1 | 11/2012 | Bentkofsky et al. | |
| 2013/0066850 A1* | 3/2013 | Konik | G06F 17/30336 |
| | | | 707/715 |

OTHER PUBLICATIONS

Mell, P. et al., "The NIST Definition of Cloud Computing (Draft)", dated Jan. 2011, Recommendations of the National Institute of Standards and Technology (NIST), U.S. Department of Commerce, Total 7 pages.

Lim, L. et al., "Dynamic Maintenance of Web Indexes Using Landmarks", WWW2003, dated May 20-24, 2003, Budapest, Hungary,Total 10 pages.

Shoens, K. et al., "Synthetic Workload Performance Analysis of Incremental Updates", Proceedings of the 17th Annual International ACM SIGIR Conference on Research and Development in Information Retrieval, Springer-Verlag New York, Inc., dated 1994, Advanced Research Projects Agency (ARPA) of the Department of Defense under Grant No. MDA972-92-J-1029 with the Corporation for National Research Initiatives (CNRI),Total 24 pages.

US Patent Application, dated Feb. 26, 2015, for U.S. Appl. No. 14/632,665, filed Feb. 26, 2015, invented by Marion Behnen et al., Total 45 pages.

Preliminary Amendment, dated Feb. 26, 2015, for U.S. Appl. No. 14/632,665, filed Feb. 26, 2015, invented by Marion Behnen et al., Total 4 pages.

List of IBM Patents or Patent Applications Treated as Related, Total 2 pages, Feb. 26, 2015.

Office Action, dated Jul. 29, 2016, for U.S. Appl. No. 14/632,665, filed Feb. 26, 2015, invented by Marion Behnen et al., Total 15 pages.

Response to Office Action, dated Oct. 27, 2016, for U.S. Appl. No. 14/632,665, filed Feb. 26, 2015, invented by Marion Behnen et al., Total 7 pages.

Final Office Action, dated Feb. 9, 2017, for U.S. Appl. No. 14/632,665, filed Feb. 26, 2015, invented by Marion Behnen et al., Total 14 pages.

Response to Final Office Action, dated May 9, 2017, for U.S. Appl. No. 14/632,665, filed Feb. 26, 2015, invented by Marion Behnen et al., Total 8 pages.

Office Action, dated Oct. 5, 2017, for U.S. Appl. No. 14/632,665, filed Feb. 26, 2015, invented by Marion Behnen et al., Total 14 pages.

Response to Office Action, dated Jan. 4, 2018, for U.S. Appl. No. 14/632,665, filed Feb. 26, 2015, invented by Marion Behnen et al., Total 12 pages.

Final Office Action, dated Feb. 20, 2018, for U.S. Appl. No. 14/632,665, filed Feb. 26, 2015, invented by Marion Behnen et al., Total 17 pages.

Response to Final Office Action, dated May 21, 2018, for U.S. Appl. No. 14/632,665, filed Feb. 26, 2015, invented by Marion Behnen et al., Total 15 pages.

Office Action, dated Jul. 2, 2018, for U.S. Appl. No. 14/632,665, filed Feb. 26, 2015, invented by Marion Behnen et al., Total 17 pages.

Response to Office Action, dated Oct. 2, 2018, for U.S. Appl. No. 14/632,665, filed Feb. 26, 2015, invented by Marion Behnen et al., Total 17 pages.

Notice of Allowance, dated Jan. 25, 2019, for U.S. Appl. No. 14/632,665, filed Feb. 26, 2015, invented by Marion Behnen et al., Total 13 pages.

* cited by examiner

POPULATING TEXT INDEXES

FIELD

Embodiments of the invention relate to populating text indexes with partial index update operations that process new sets of documents or incremental changes to a set of documents.

BACKGROUND

To support document retrieval for large-scale content management solutions, full-text search solutions are available. For speedy response times and flexible search options, full-text search queries may rely on text indexes (also referred to as "text search indexes") to access relevant data.

Populating a text index requires resource-intensive steps to parse documents, apply language-specific processing to the terms found in the documents, and to write the processed terms into an index. Processing a large number of documents may therefore take significant time and resources. To balance workloads it is therefore necessary to provide controls that enable a fine-tuning of the index processing.

One example is that with increasing demands on the capabilities of indexing (also referred to as "text indexing"), customers may need to re-create text indexes if a new text index solution does not provide backward compatibility to the previously used text search solution, for example, due to incompatible storage mechanisms or differences in index data structures.

Such a backward incompatibility requires a re-indexing of the document corpus, however, documents might already be archived in high-latency storage and only metadata kept online. The retrieval of documents in such scenarios may therefore add significantly to the duration of the index processing and may require multiple sessions.

SUMMARY

Provided is a method for populating a new text index. The method comprises, in response to determining that a limit for indexing a set of documents to the new text index has been reached, performing a commit, updating a restart key to identify a next document to be indexed, and indexing the next document in a next commit cycle.

Provided is a computer program product for populating a new text index. The computer program product comprises a computer readable storage medium having program code embodied therewith, the program code executable by at least one processor to perform: in response to determining that a limit for indexing a set of documents to the new text index has been reached, performing, by the at least one processor, a commit; updating, by the at least one processor, a restart key to identify a next document to be indexed; and indexing, by the at least one processor, the next document in a next commit cycle.

Provided is a computer system for populating a new text index. The computer system comprises: one or more processors, one or more computer-readable memories, and one or more computer-readable, tangible storage devices; and program instructions, stored on at least one of the one or more computer-readable, tangible storage devices for execution by at least one of the one or more processors via at least one of the one or more memories, to perform operations, wherein the operations comprise: in response to determining that a limit for indexing a set of documents to the new text index has been reached, performing a commit, updating a restart key to identify a next document to be indexed, and indexing the next document in a next commit cycle.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
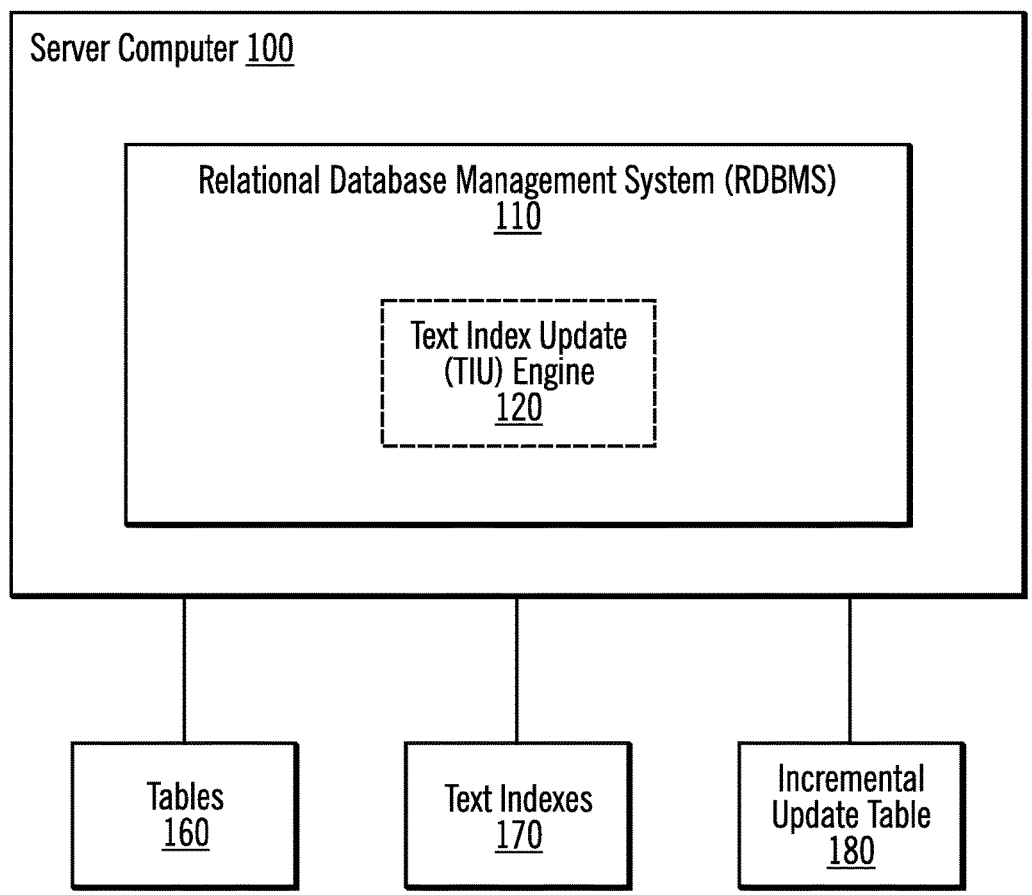
FIG. 1 illustrates, in a block diagram, a computing environment in accordance with certain embodiments.

FIG. 1 illustrates, in a block diagram, a computing environment in accordance with certain embodiments. A server computer 100 includes a Relational Database Management System (RDBMS) 110. The RDBMS 110 may include or work with a Text index Update (TIU) engine 120. In various embodiments, the TIU engine 120 may be part of and controlled by the RDBMS 110 or may be separate from and controlled by the RDBMS 110.

The server computer 100 is coupled to tables 160, text indexes 170, and an incremental update table 180. In certain embodiments, a table 160 has rows, and each row is associated with a document to be indexed and each row has a document identifier for the associated document. In certain embodiments, the incremental update table 180 identifies rows to be re-indexed. In various embodiments, the tables 160, text indexes 170, and/or the incremental update table 180 are controlled by the RDBMS 110 and may be stored in different physical storage at different physical locations.

The text indexes 170 may be created on direct or indirect content of a specified data source. Direct content may be, for example, the content of a specific database column. Indirect content may be documents for which a Uniform Resource Locator (URL) is provided in the data source on which the text index 170 is created. If creating a new text index is not feasible in a migration scenario due to resource and timing concerns, various mechanisms may be used for mitigation. With embodiments, these mechanisms include side-by-side usage of new and old text indexes for the same data source, re-indexing with a data source switch between initial and incremental updates, and additional options to control when and for how long an index update may run per indexing session. With each of these options the text index update relies on a row identifier that is assigned to the document to determine whether the document has been indexed or still requires indexing. In certain embodiments, a row identifier may be a primary key.

With embodiments, various options may be combined to tailor an index migration for text indexes: 1) re-indexing with input switch and/or 2) timing and document control options.

With re-indexing with input switch, the TIU engine 120 creates a new text index with an incremental update setting, while the initial population is based on prepared documents. These prepared documents may be supplied from online or offline storage or may be re-constructed from an old text index. The incremental update is blocked until the initial population is complete.

With timing and document control options, for additional control it is possible to specify how many documents (rows) are to be indexed in one session. The scope may be defined either in number of documents ("document limit") or time ("time limit" identifying elapsed time). In certain embodiments, timestamps may be used to determine the duration of an execution period. To prevent loss of data, this scope may be partitioned in commit cycles. When a commit cycle is completed, a commit is performed to persist the text index and metadata, such as the restart key, to storage (e.g., non-volatile storage). For example, it may be desired to have a commit cycle of 3,000 documents, and, then, a commit is performed after 3,000 documents are processed. In certain embodiments, an index manager (e.g., a system administrator) may set a document limit or a time limit (which either corresponds or can be mapped to a number of rows of the table to be indexed) and combine this with a number of commit cycles. If at least one commit cycle is defined, the initial update processing proceeds based on sorted row identifiers and keeps changes for already processed documents for later processing in the incremental update phase. The changes may be stored as a list of row identifiers in the incremental update table 180. An initial update may be described as processing the rows of a table to populate an index for that table.

The TIU engine 120 checks, after processing a document associated with a row, whether the document limit or the time limit has been reached. If more documents need processing and neither limit has been reached, the TIU engine 120 marks the row identifier of the last processed document. If a commit cycle is completed, the marked row identifier is saved as restart key. In certain embodiments, the restart key identifies a next document to be indexed in one of a new commit cycle and a new index update. If the number of specified commit cycles is not yet reached and more documents are due for processing, the TIU engine 120 continues processing the next document in the next commit cycle, otherwise, the TIU engine 120 stops processing documents. When the next commit cycle starts, the TIU engine 120 continues 1) with the previously marked row identifier for initial updates or 2) with the next row identifier that is due for processing for incremental updates.

Figure 2:
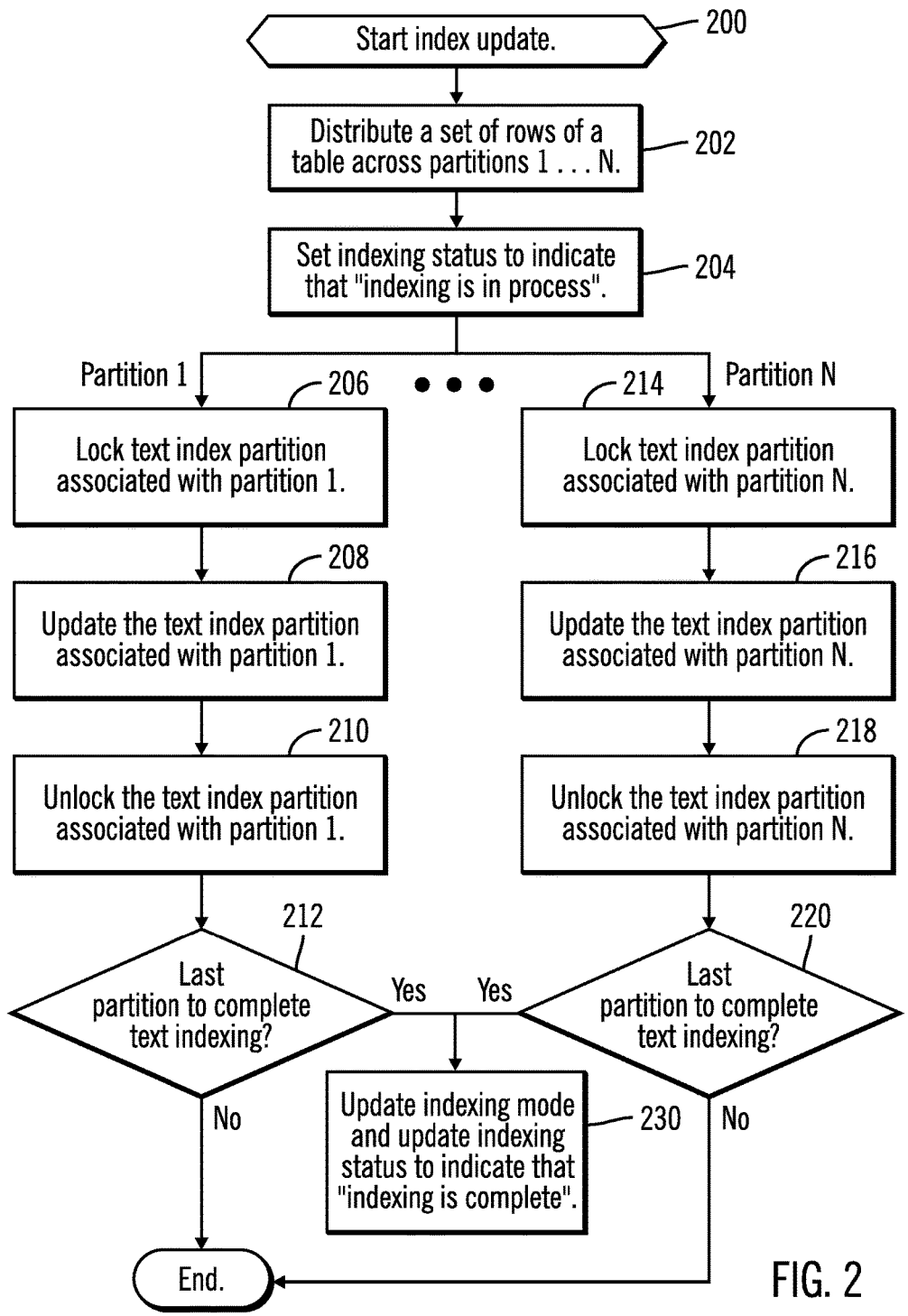
FIG. 2 illustrates, in a flow diagram, operations for indexing a table across partitions in accordance with certain embodiments.

FIG. 2 illustrates, in a flow diagram, operations for indexing a table across partitions in accordance with certain embodiments. Control begins at block 200 with the RDBMS 110 starting index update (e.g., in response to a request from an index manager or at a scheduled time). In block 202, the RDBMS 110 distributes a set of rows of the table to be indexed across partitions 1 . . . N. The partitions 1 . . . N may be logical partitions or physical partitions. In certain embodiments, distributing the set of documents refers to allocating different rows of the table being indexed to each of the partitions 1 . . . N. In certain embodiments, each partition is also associated with a partition of the full text index ("text index partition").

In block 204, the RDBMS 110 sets an indexing status to indicate that "indexing is in process". This enables other processes to quickly identify that indexing is in process. The indexing status indicates either that "indexing is in process" or that "indexing is complete".

Blocks 206-212 and 230 describe processing by the TIU engine 120 occurring at partition 1, while blocks 214-220 and 230 describe processing by the TIU engine 120 occurring at partition N, and the ellipses indicate that there may be other partitions at which the TIU engine 120 performs the processing occurring at partitions 1 and N. The operations of blocks 208 and 216 are described further with reference to FIGS. 3A, 3B, 3C, and 3D.

At partition 1, the TIU engine 120 locks a text index partition associated with partition 1 (block 206), updates the text index partition associated with partition 1 (block 208), and unlocks the text index partition associated with partition 1 (block 210). Then, at partition 1, the TIU engine 120 determines whether partition 1 is the last partition to complete indexing (block 212). If so, processing continues to block 230, otherwise, processing is done. In block, 230, the TIU engine 120 updates an indexing mode and updates an indexing status to indicate that "indexing is complete". Then, control returns to the RDBMS 110. In certain embodiments, there is an indexing mode for all partitions (and there is a partition mode per partition). The indexing mode may be either "initial mode" or "incremental mode". In certain embodiments, if all partitions are in "incremental mode", the TIU engine 120 sets the indexing mode to "incremental mode" in block 230. In certain embodiments, the initial mode uses a different data source than the incremental mode. The text index is created for a table that stores either 1) document identifiers and the documents or 2) document identifiers and references to the documents (e.g., that have been archived and these archived documents are retrieved and indexed). For example, the initial mode may generate index data from the documents stored in the table, may generate index data from the documents that are referenced in the table or may obtain index data from an older text index.

At partition N, the TIU engine 120 locks a text index partition associated with partition N (block 214), updates the text index partition associated with partition N (block 216), and unlocks the text index partition associated with partition N (block 218). Then, at partition N, the TIU engine 120 determines whether partition N is the last partition to complete indexing (block 220). If so, processing continues to block 230, otherwise, processing is done.

In certain embodiments, the TIU engine 120 may determine which partitions have completed by checking on whether each other partition has marked the text index update at that partition as complete. If all of the other partitions have completed the text index update, then the current partition is the last one to complete.

FIGS. 3A, 3B, 3C, and 3D illustrate, in a flow diagram, operations for indexing at one partition in accordance with certain embodiments. Control begins at block 300, with the TIU engine 120 starting the index update for rows of a table associated with one partition from a set of partitions. In block 302, the TIU engine 120 determines whether this is an initial index update. If so, processing continues to block 304, otherwise, processing continues to block 340. In certain embodiments, each partition has an associated partition mode. The partition mode may be either "initial mode" (to indicate that this is an initial index update) or "incremental mode" (to indicate that incremental changes are being processed and that this is an incremental index update). The default value of the partition mode is "initial mode".

Figure 3A:
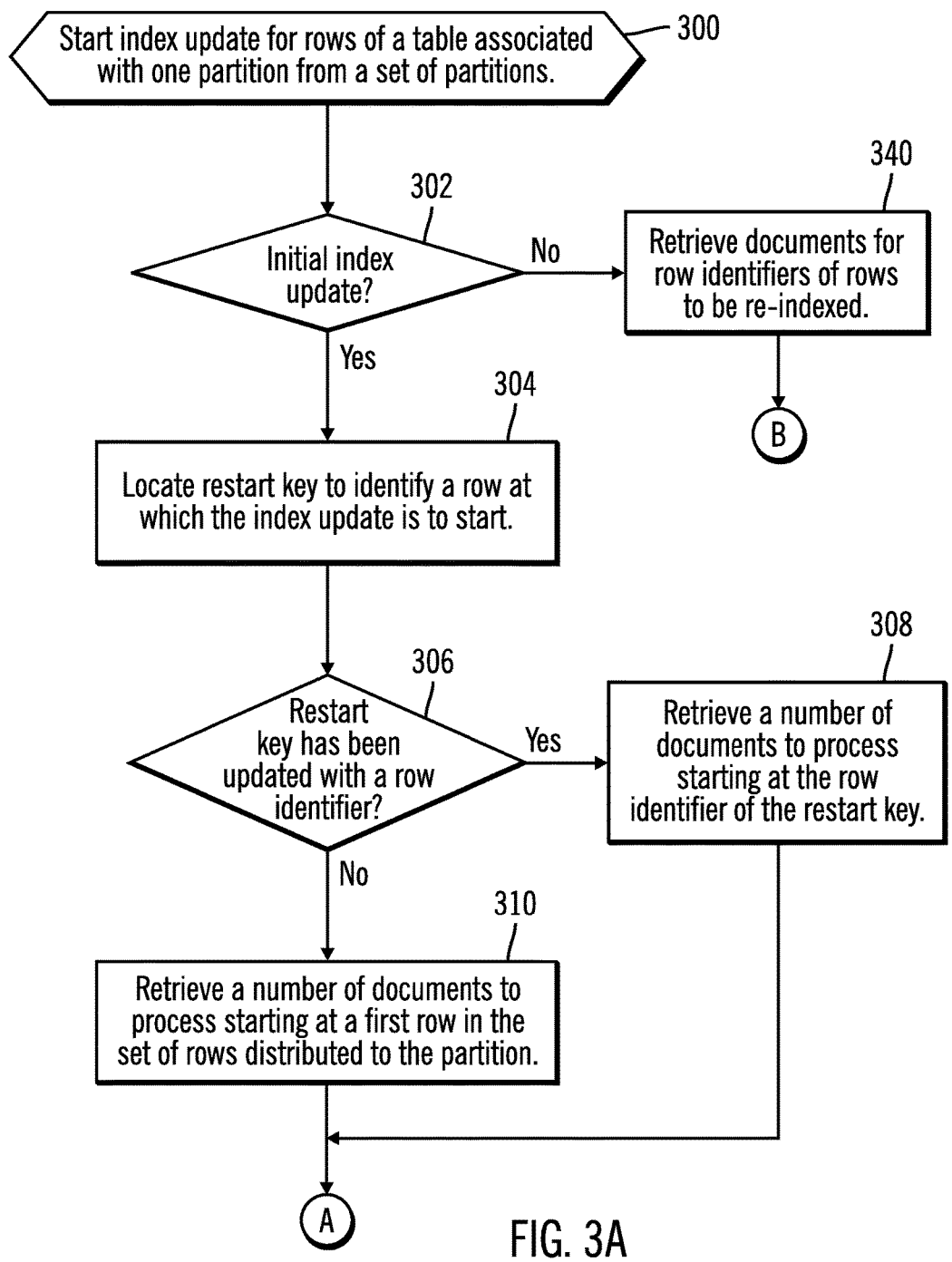
FIGS. 3A, 3B, 3C, and 3D illustrate, in a flow diagram, operations for indexing at one partition in accordance with certain embodiments.
Figure 3B:
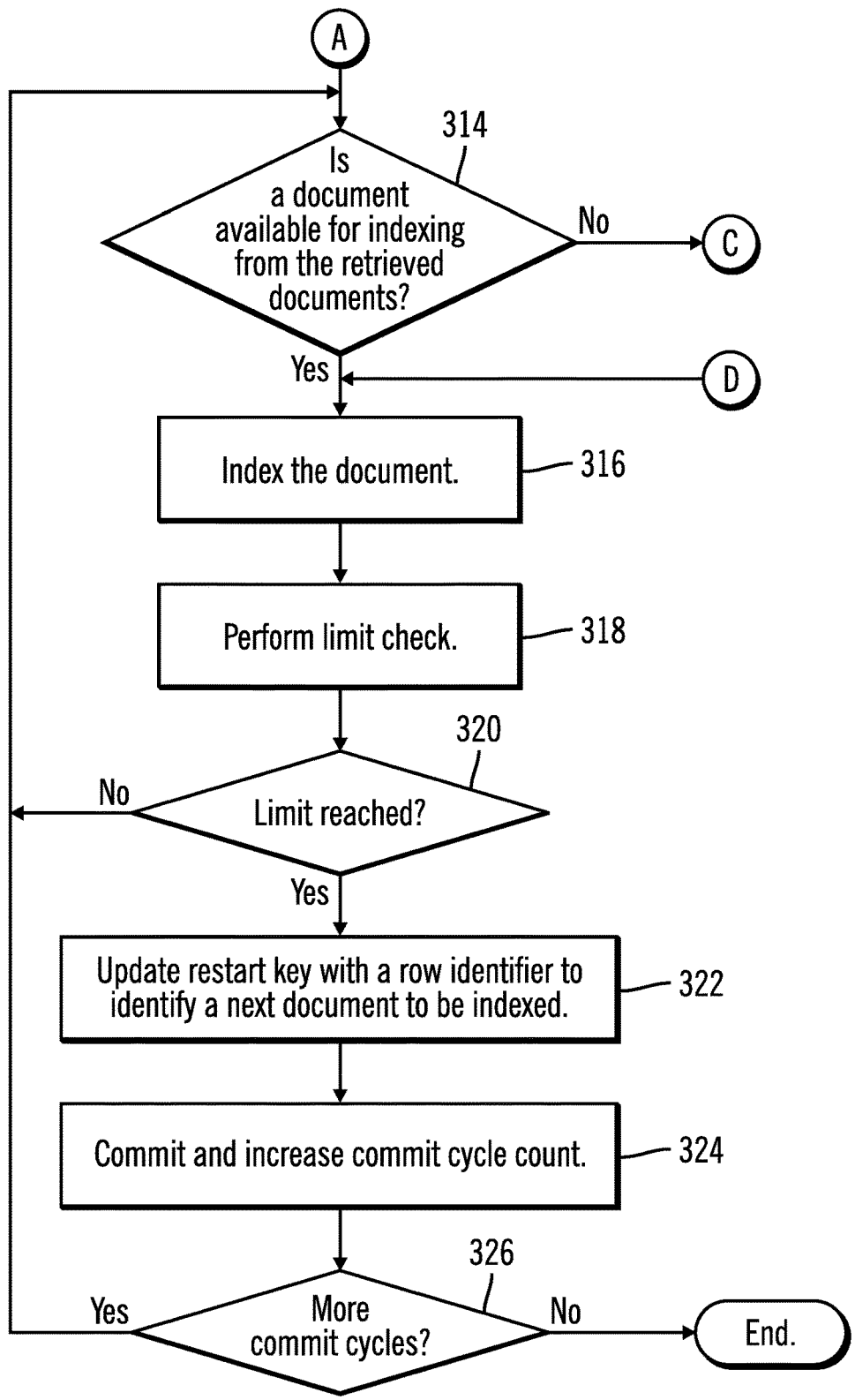

In block 304, the TIU engine 120 locates a restart key to identify a row at which the index update is to start. In block 306, the TIU engine 120 determines whether the restart key has been updated with a row identifier. If so, processing continues to block 308, otherwise, processing continues to block 310. In block 308, the TIU engine 120 retrieves a number of documents to process starting at the row identifier of the restart key. In various embodiments, the number of documents retrieved in block 308 may be the same as the document limit, less than the document limit, or greater than the document limit. From block 308, processing continues to block 314 (FIG. 3B). In block 310, the TIU engine 120 retrieves a number of documents to process starting at a first row in the set of rows distributed to the partition. In various embodiments, the number of documents retrieved in block 310 may be the same as the document limit, less than the document limit, or greater than the document limit. From block 310, processing continues to block 314 (FIG. 3B).

In block 314, the TIU engine 120 determines whether a document is available for indexing from the retrieved documents. If so, processing continues to block 316, otherwise (all retrieved documents have been processed), processing continues to block 328. In block 316, the TIU engine 120 indexes the document, which is described in further detail with reference to FIG. 6. In block 318, the TIU engine 120 performs a limit check (described with reference to FIG. 4). In block 320, the TIU engine 120 determines whether the limit has been reached. If so, processing continues to block 322, otherwise, processing continues to block 314.

In block 322, the TIU engine 120 updates the restart key with a row identifier to identify a next document to be indexed. In block 324, the TIU engine 120 commits, that is, persists the updated text index and metadata, and increases the commit cycle count. In block 326, the TIU engine 120 determines whether there are more commit cycles based on the increased commit cycle count. If so, processing continues to block 314, otherwise, processing ends. In block 328, the TIU engine 120 determines whether there are additional documents to be retrieved (e.g., when documents are retrieved in batches). If so, processing continues to block 330, otherwise, processing ends. In block 330, the TIU engine 120 retrieves additional documents. In block 332, the TIU engine 120 determines whether a document is available for indexing from the retrieved documents. If so, processing continues to block 316, otherwise (all retrieved documents have been processed), processing continues to block 334. In block 334, the TIU engine 120 resets the restart key to the beginning of the set of rows assigned to this partition and sets the partition mode to "incremental mode". Then, processing ends.

Figure 3C:
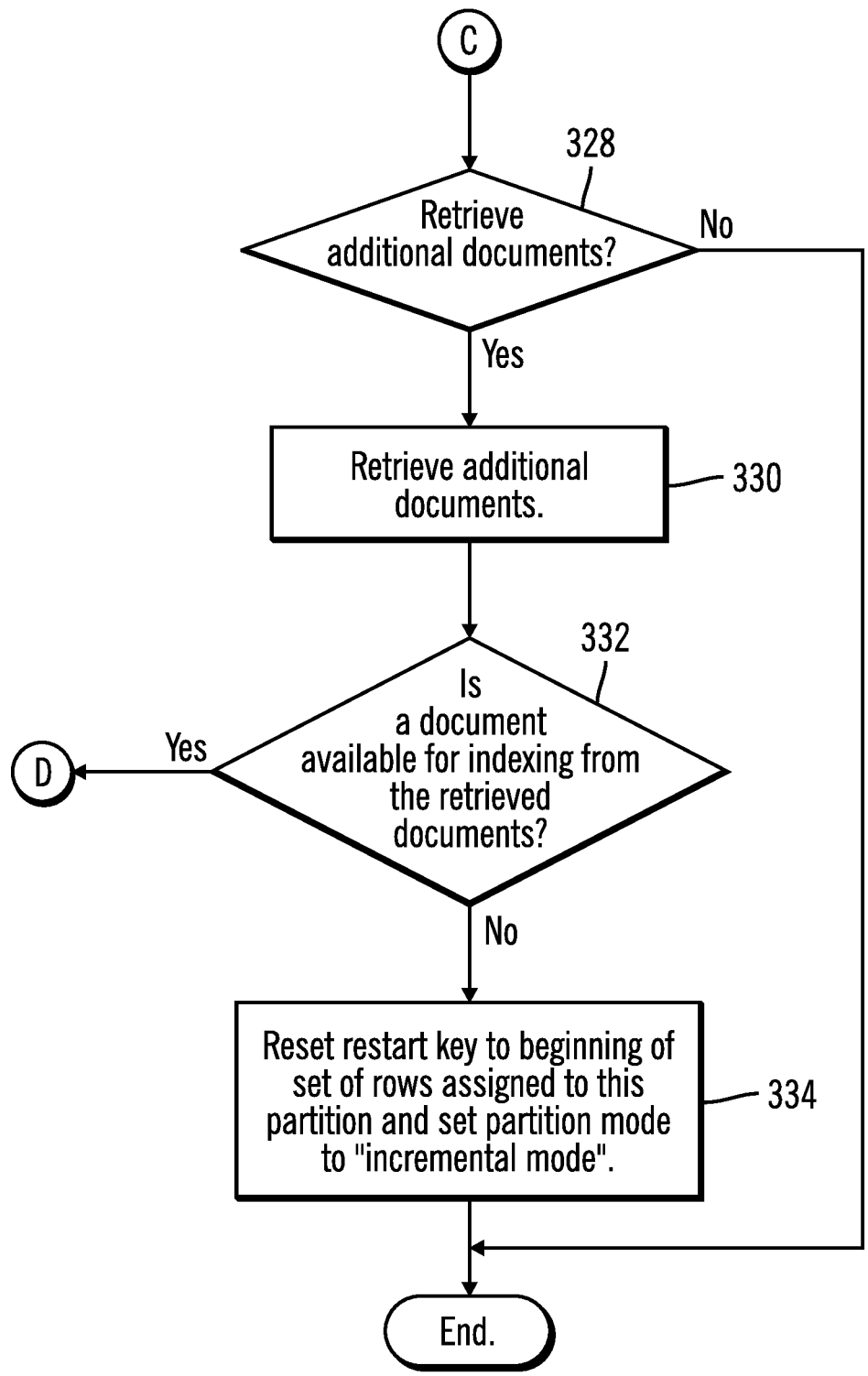
Figure 3D:
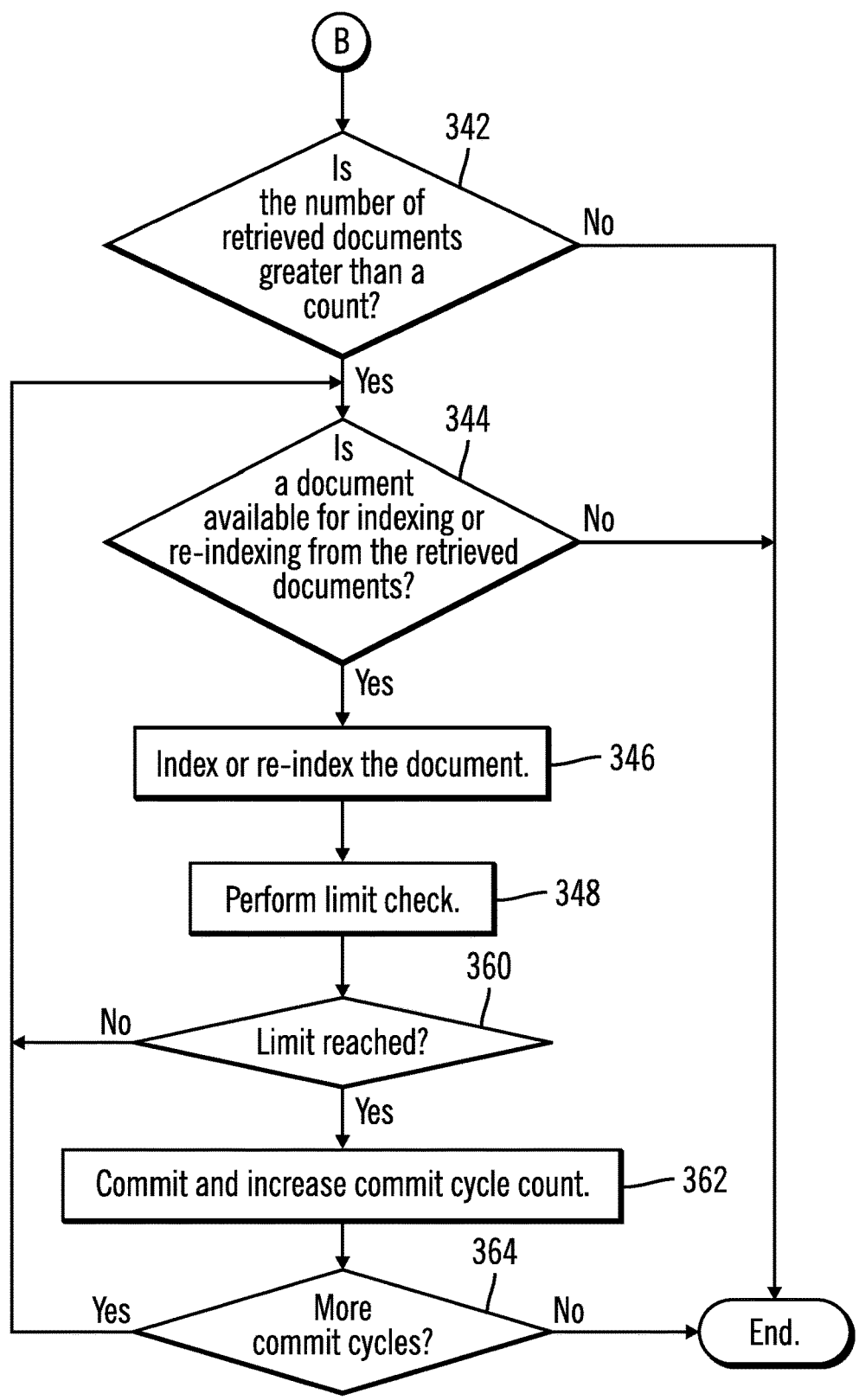

In block 340 (FIG. 3A), the TIU engine 120 retrieves documents for row identifiers of rows to be re-indexed. In certain embodiments, the RDBMS 110 stores the row identifiers of these rows to be re-indexed in the incremental update table 180. From block 340, processing continues to block 342 (FIG. 3C). In block 342, the TIU engine 120 determines whether the number of retrieved documents is greater than a count. If so, processing continues to block 344, otherwise, processing ends. That is, an index manager may set the count to a value to indicate that incremental index update should occur only if there are more than the count number of documents to be processed.

In block 344, the TIU engine 120 determines whether there is a document available for indexing or re-indexing from the retrieved documents. A document that has previously been indexed during the initial update is re-indexed later, while a document that was not previously indexed is indexed at this time. If so, processing continues to block 346, otherwise, processing ends. In block 346, the TIU engine 120 re-indexes or re-indexes the document, which is described in further detail with reference to FIG. 6. In block 348, the TIU engine 120 performs a limit check (described with reference to FIG. 4). In block 350, the TIU engine 120 determines whether the limit has been reached. If so, processing continues to block 352, otherwise, processing continues to block 344. In block 352, the TIU engine 120 commits, that is, persists the updated text index and metadata, and increases the commit cycle count. In block 354, the TIU engine 120 determines whether there are more commit cycles based on the increased commit cycle count. If so, processing continues to block 344, otherwise, processing ends.

Figure 4:
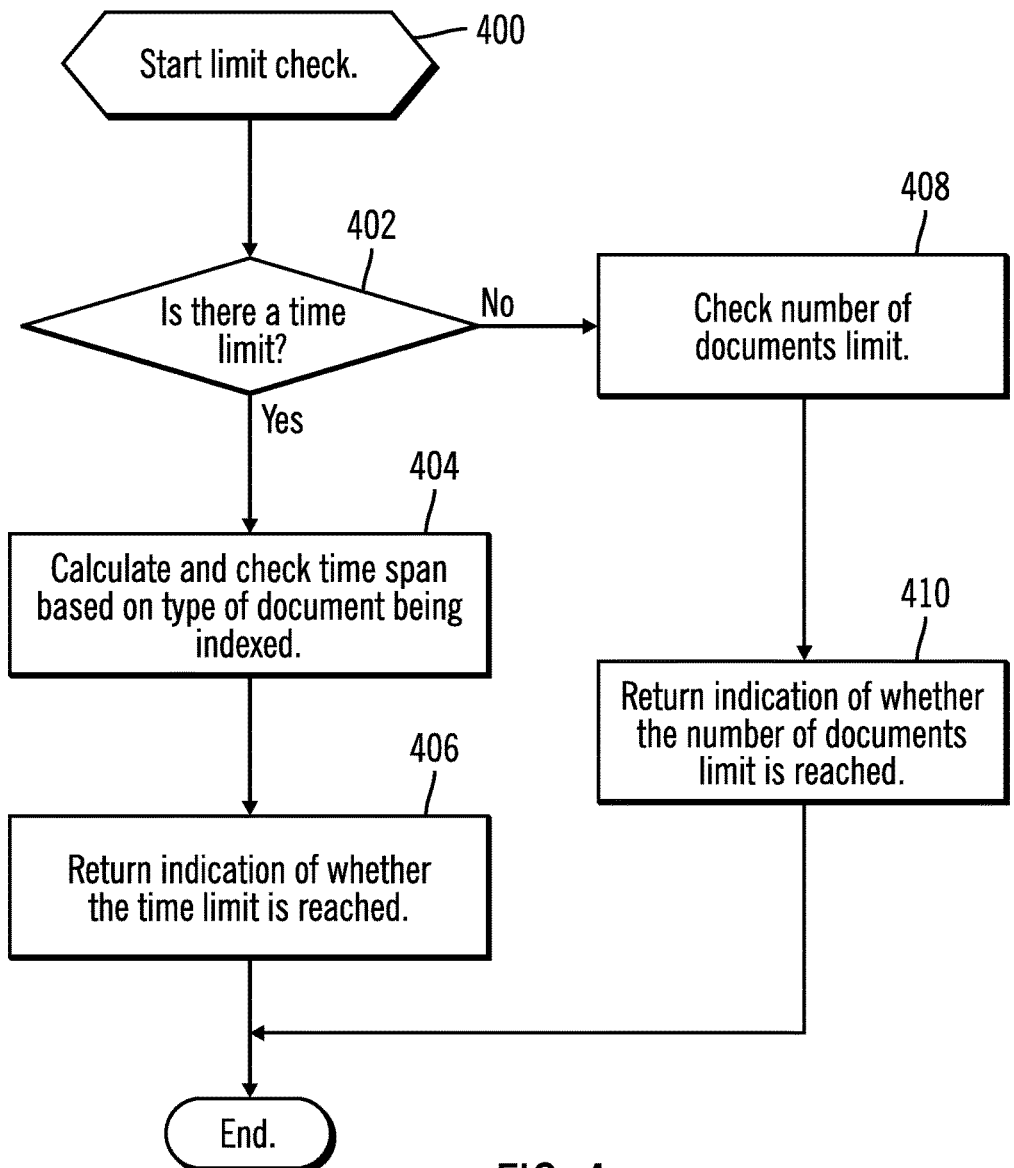
FIG. 4 illustrates, in a flow diagram, operations for a limit check in accordance with certain embodiments.
Figure 5:
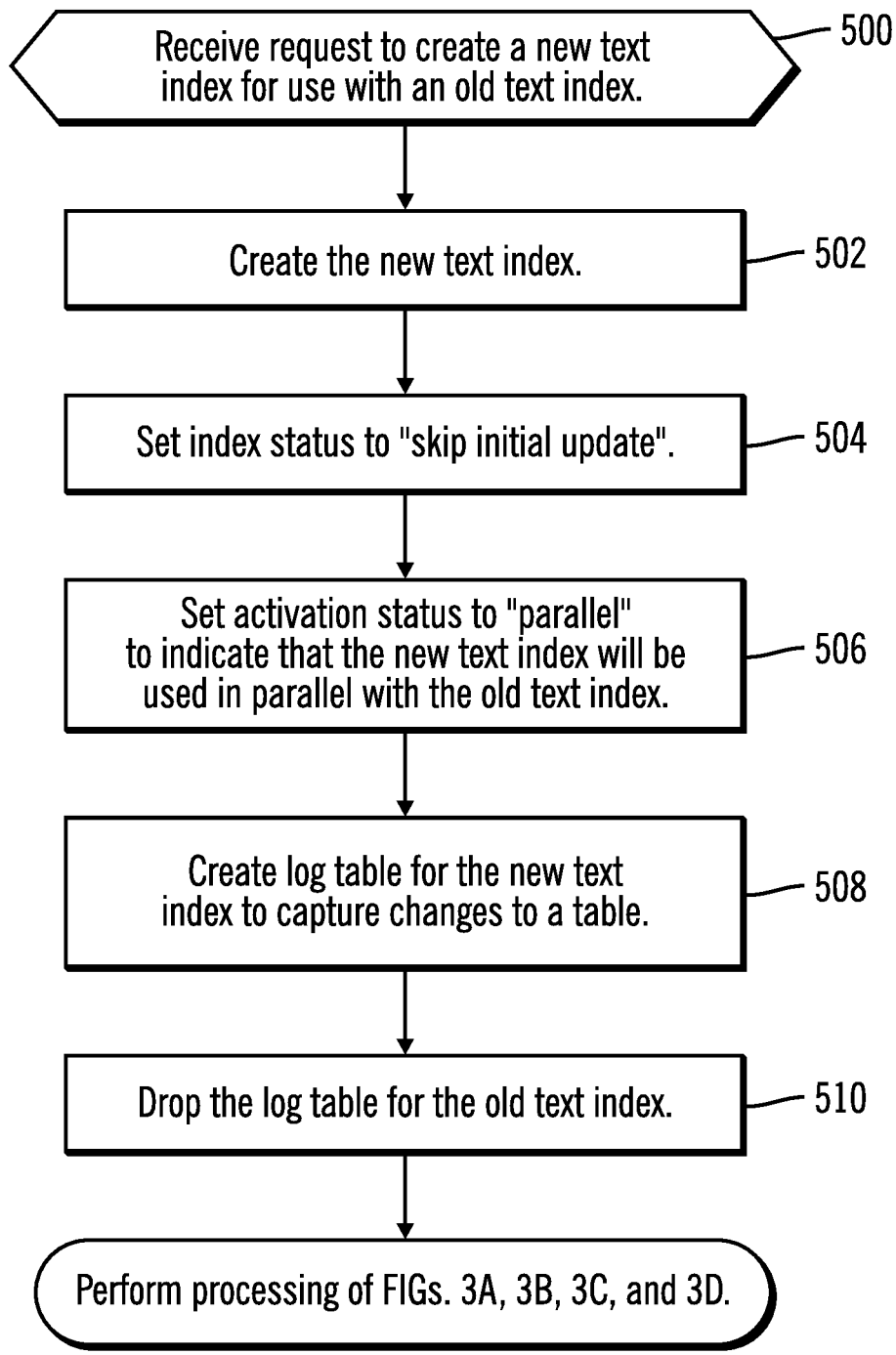
FIG. 5 illustrates, in a flow diagram, operations for maintaining a new text index and an old text index in parallel in accordance with certain embodiments.

FIG. 4 illustrates, in a flow diagram, operations for a limit check in accordance with certain embodiments. Control begins at block 400 with the TIU engine 120 starting the limit check. In block 402, the TIU engine 120 determines whether there is a time limit. If so, processing continues to block 404, otherwise, processing continues to block 408 (as there is a limit on number of documents instead). In block 404, the TIU engine 120 calculates and checks a time span based on a type of document being indexed. In certain embodiments, it may take a different amount of time to index different types of documents. For example, indexing text in a Portable Data Format (PDF) document may take significantly longer than indexing text from a simple character field. Depending on the specified time limits it may therefore not be necessary to calculate and check a time span as part of the processing for each single document. Thus, to reduce administrative overhead, the calculation and checking of block 404 take the average processing time for the type of document and number of documents in the cycle into account. In block 406, the TIU engine 120 returns an indication of whether the time limit has been reached. In block 408, the TIU engine 120 checks the number of documents limit. In block 410, the TIU engine 120 returns an indication of whether the number of documents limits has been reached.

FIGS. 5A, 5B, 5C, and 5D illustrate, in a flow diagram, operations for maintaining a new text index and an old text index in parallel in accordance with certain embodiments. Control begins at block 500 with the TIU engine 120 receiving a request to create a new text index for use with old text index. In block 502, the TIU engine 120 creates a new text index. In block 504, the TIU engine 120 sets an index status to "skip initial update" (i.e., the table for which the new text index is created is not processed to add documents from that table to the new text index because the old text index has been created for these documents). In certain embodiments, setting the index status to "skip initial update" also sets the index mode to "incremental mode". In block 506, the TIU engine 120 sets activation status to "parallel" to indicate that the new text index will be used in parallel with the old text index. Activation status may be set to "active" (also referred to as unblocked), "blocked", "update only", and "parallel". In block 508, the TIU engine 120 creates a log table for the new text index to capture changes to the table for which the new text index is being created. The changes include insert, update, and delete operations. In block 510, the TIU engine 120 drops the log table for the old text index (because any new changes to the table will update the new text index and if applicable, the old text index, and so there is no need to log new changes for the old text index separately). From block 510, processing continues FIGS. 3A, 3B, 3C, and 3D.

Figure 6:
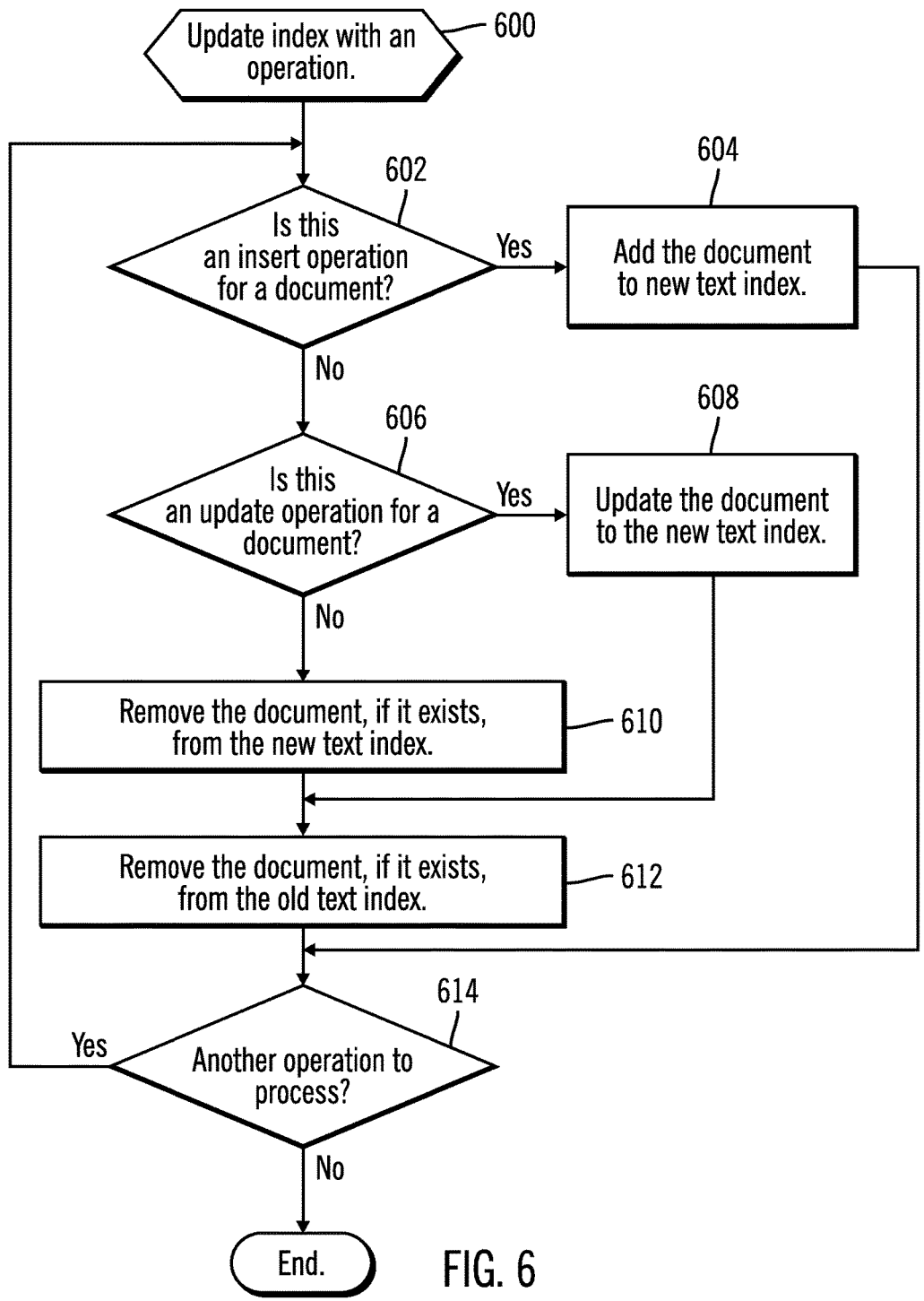
FIG. 6 illustrates, in a flow diagram, operations for processing an update index request in accordance with certain embodiments.

FIG. 6 illustrates, in a flow diagram, operations for processing an update index request in accordance with certain embodiments. Control begins at block 600 with the TIU engine 120 receiving an update index request with an operation (e.g., insert, update or delete). In block 602 the TIU engine 120 determines whether the operation is an insert operation for a document. If so, processing continues to block 604, otherwise, processing continues to block 606. In block 604 the TIU engine 120 adds the document to the new text index and processing continues to block 614.

In block 606, the TIU engine 120 determines whether the operation is an update operation for a document. If so, processing continues to block 608, otherwise (the operation is a delete operation for a document), processing continues to block 610. In block 608, the TIU engine 120 updates the document to the new text index and processing continues to block 612.

In block 610, the TIU engine 120 removes the document, if it exists, from the new text index. In block 612, the TIU engine 120 removes the document, if it exists, from the old text index. In block 614, the TIU engine 120 determines whether there is another operation to process. If so, processing continues to block 602, otherwise, processing ends.

In certain embodiments, it may not be feasible to recreate a text index on the full set of old and new documents. A new text index TN1 is created with activation status set to "parallel" on a table column TC which already hosts an old text index TO1. The log table for the old text index TO1 is removed and all document changes are captured in a log table associated with the new text index TN1. When an index update request is received, new documents (identified with logrecord-type 'insert') are added to the new text index TN1. Modified documents (identified as logrecord-type 'update') are added or updated into the new text index TN1 and deleted from the old text index TO1 (optionally, a conversion of the row identifier is applied). Deleted documents (identified as logrecord-type 'delete') are deleted from the new text index TN1 or the old text index TO1, if the document exists.

When a parallel text index is available for a table column TC, and a user submits a search request (query) on that table column TC, then, if the search condition may be fulfilled from the new text index TN1, a query is submitted to the new text index TN1. If the search condition may be fulfilled from the old text index TO1, the query is submitted to the old text index TO1.

In all other cases, the query is submitted to the new text index TN1 in parallel with the old text index TO1. When a query is submitted to the old text index TO1, the query may need to be converted into an expression that may be processed by the old text index TO1. Results from the old text index TO1 may be converted to row identifiers that may be combined with results from the new text index TN1. The combined results are then returned to the user.

Figure 7A:
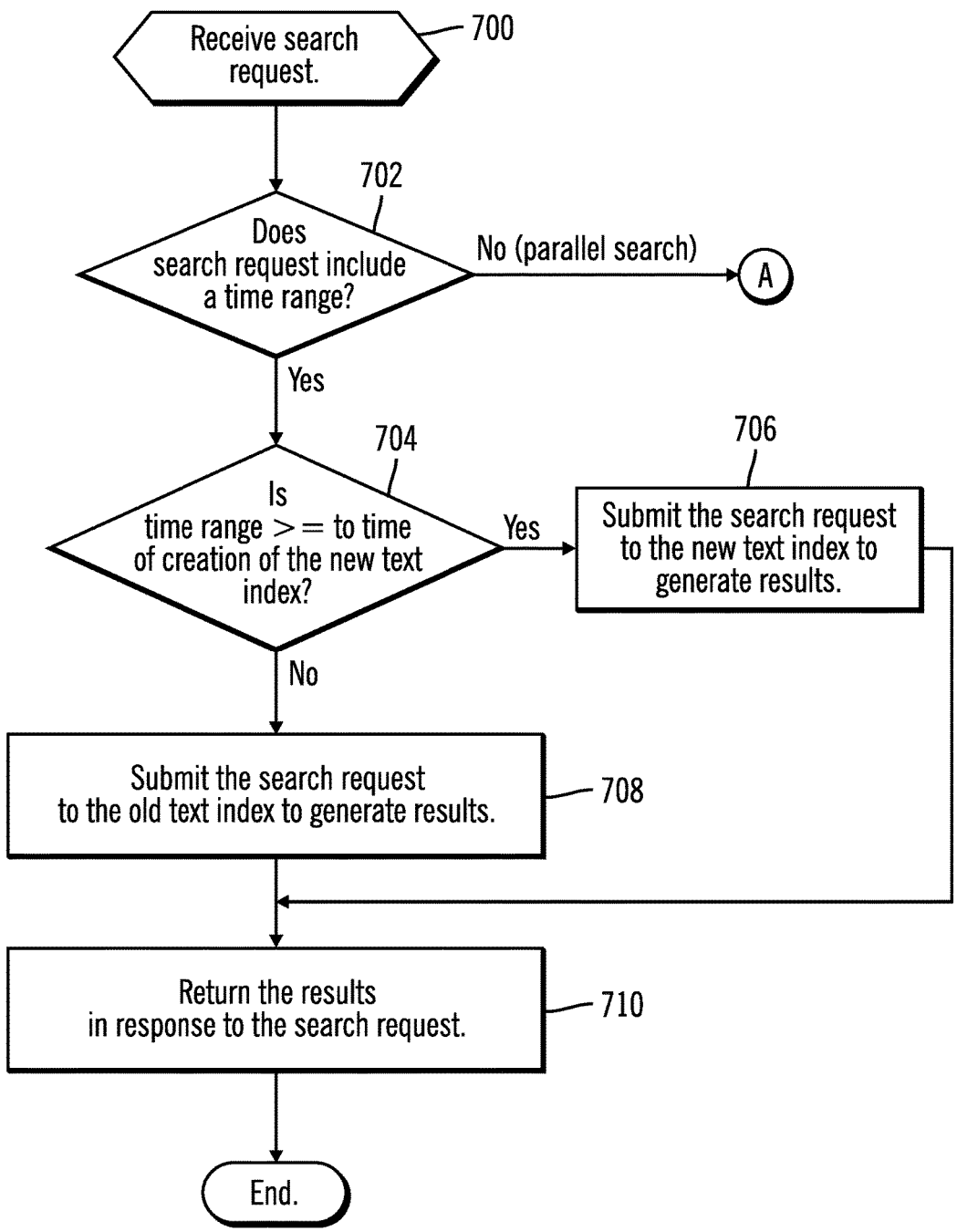
FIGS. 7A and 7B illustrate, in a flow diagram, operations for processing a search request in accordance with certain embodiments.
Figure 7B:
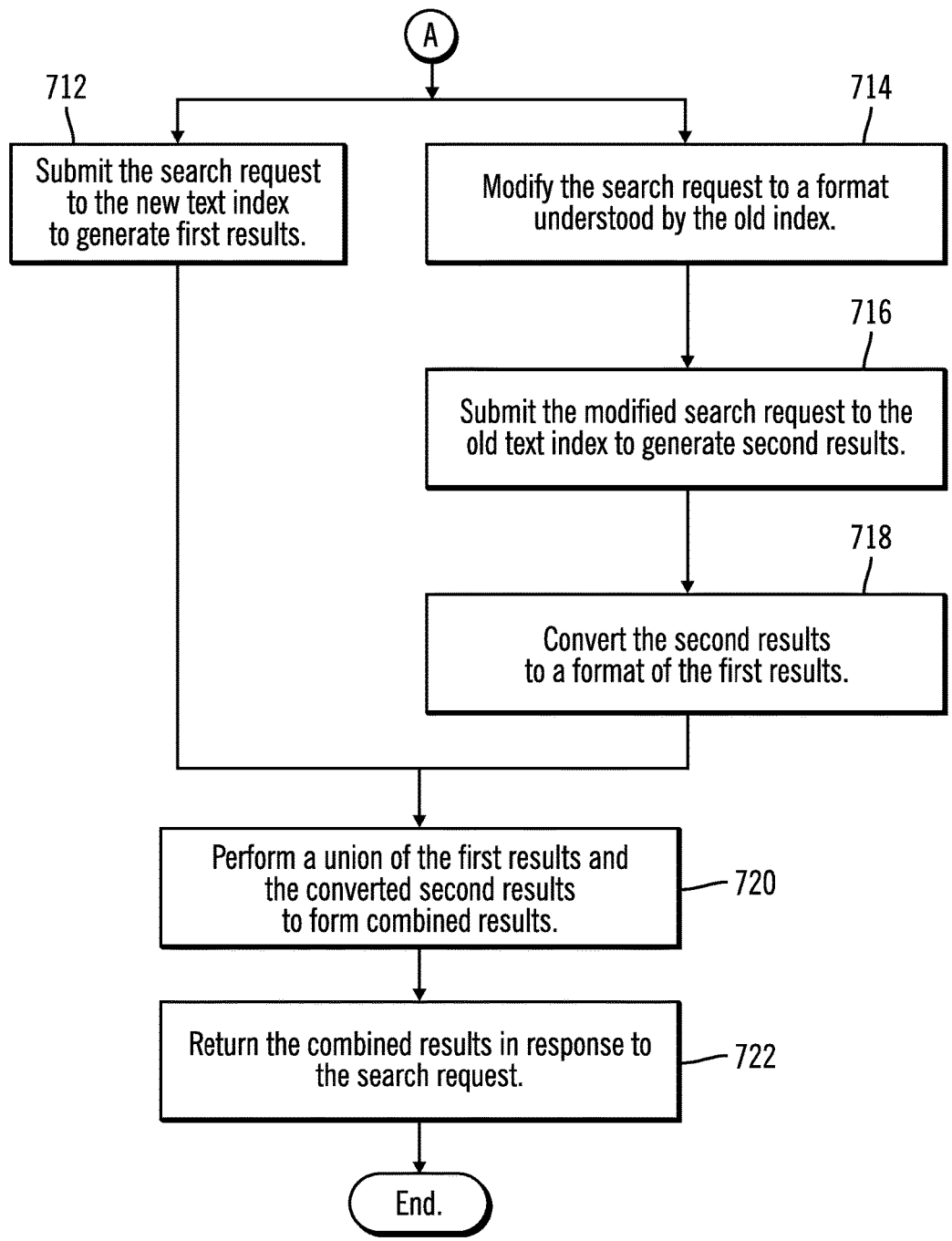

FIGS. 7A and 7B illustrate, in a flow diagram, operations for processing a search request in accordance with certain embodiments. Control begins at block 700 with the TIU engine 120 receiving a search request (e.g., a query). In block 702, the TIU engine 120 determines whether the search request includes a time range. If so, processing continues to block 704, otherwise, processing continues to block 710 (FIG. 7B). In block 704, the TIU engine 120 determines whether the time range is greater than or equal to the time of creation of the new text index. If so, processing continues to block 706, otherwise, processing continues to block 708. In block 706, the TIU engine 120 submits the search request to the new text index to generate results. In block 708, the TIU engine 120 submits the search request to the old text index to generate results. In block 710, the TIU engine 120 returns the results in response to the search request.

The processing of block 712 and blocks 714-718 may be performed in parallel. In block 712, the TIU engine 120 submits the search request to the new text index to generate first results and processing continues to block 720. In block 714, the TIU engine 120 modifies the search request to a format understood by the old text index. In block 716, the TIU engine 120 submits the modified search request to the old text index to generate second results. In block 718, the TIU engine 120 converts the second results to a format of the first results. In block 720, the TIU engine 120 performs a union of the first results and the converted second results to form combined results. In block 722, the TIU engine 120 returns the combined results in response to the search request.

Figure 8A:
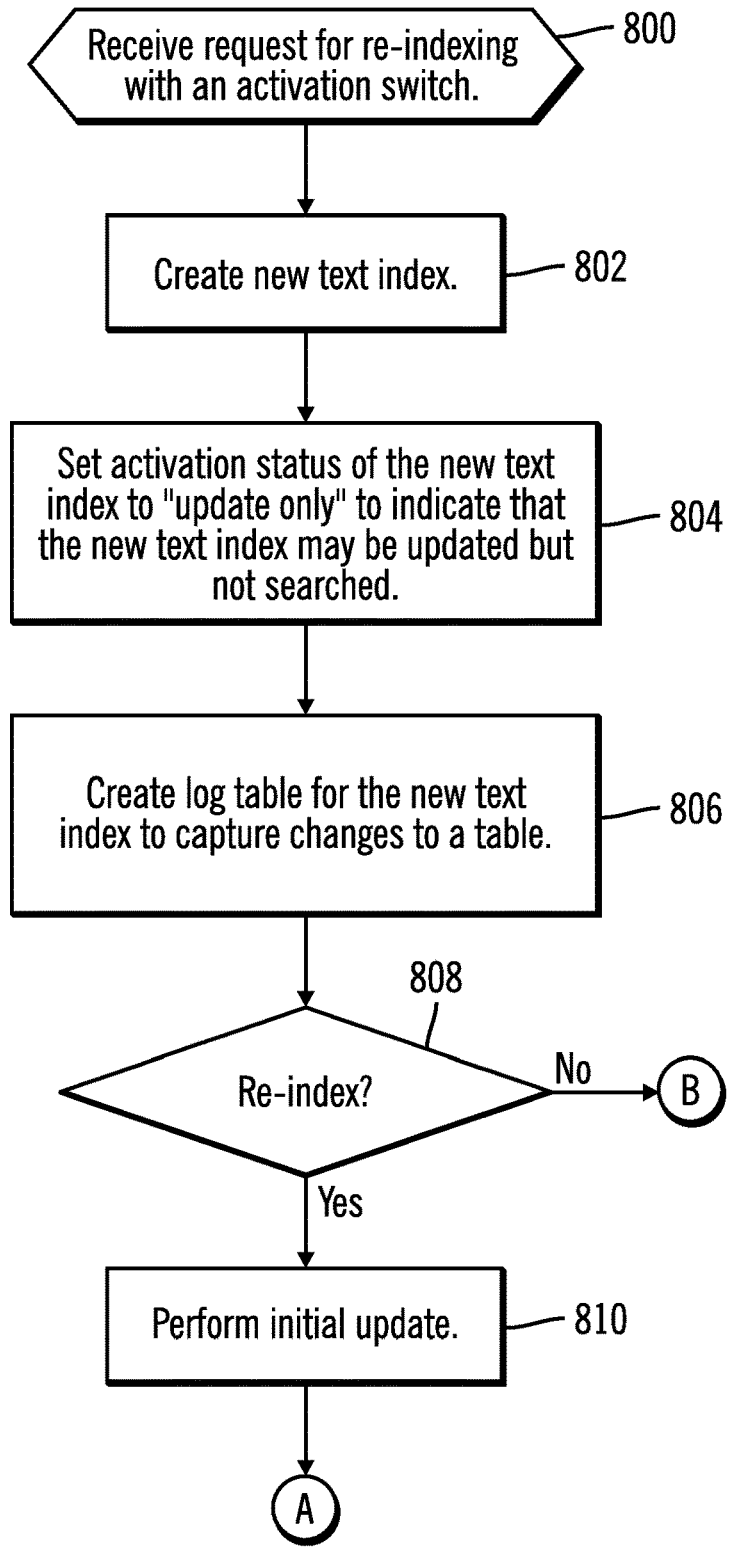
FIGS. 8A, 8B, and 8C illustrate, in a flow diagram, operations for re-indexing with an activation switch in accordance with certain embodiments.
Figure 8B:
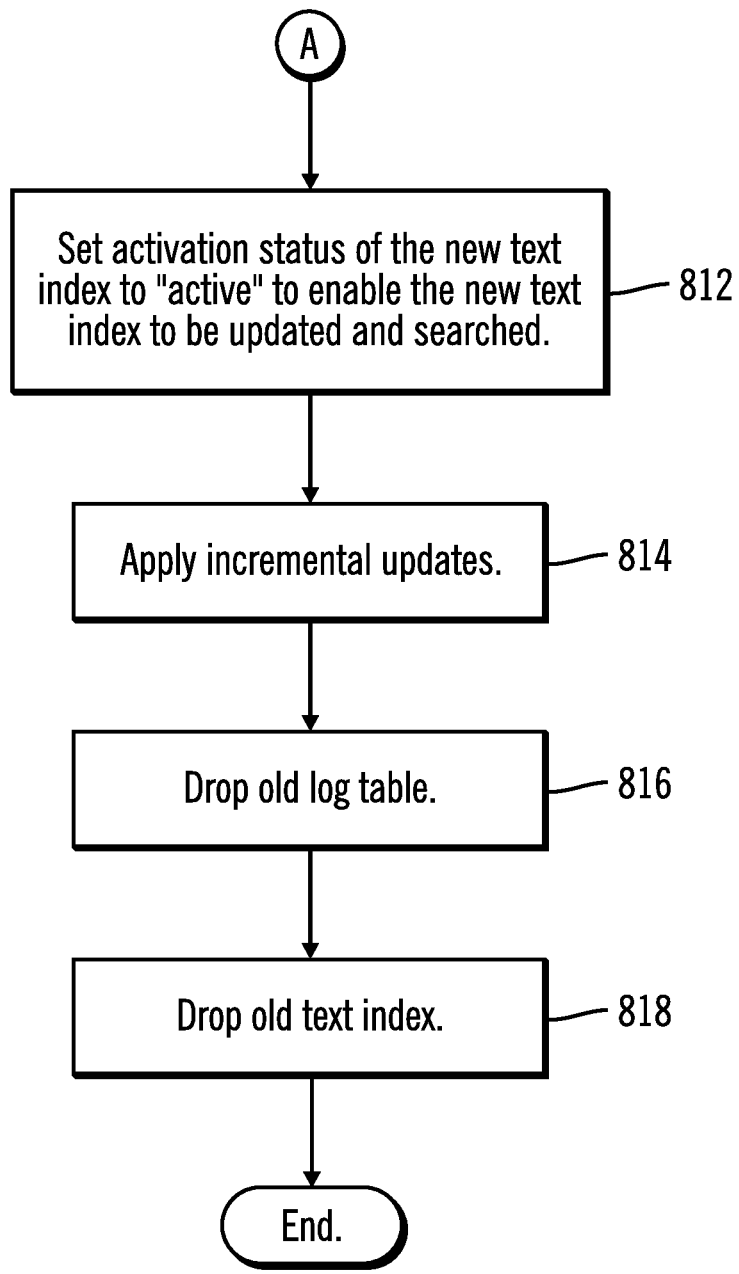
Figure 8C:
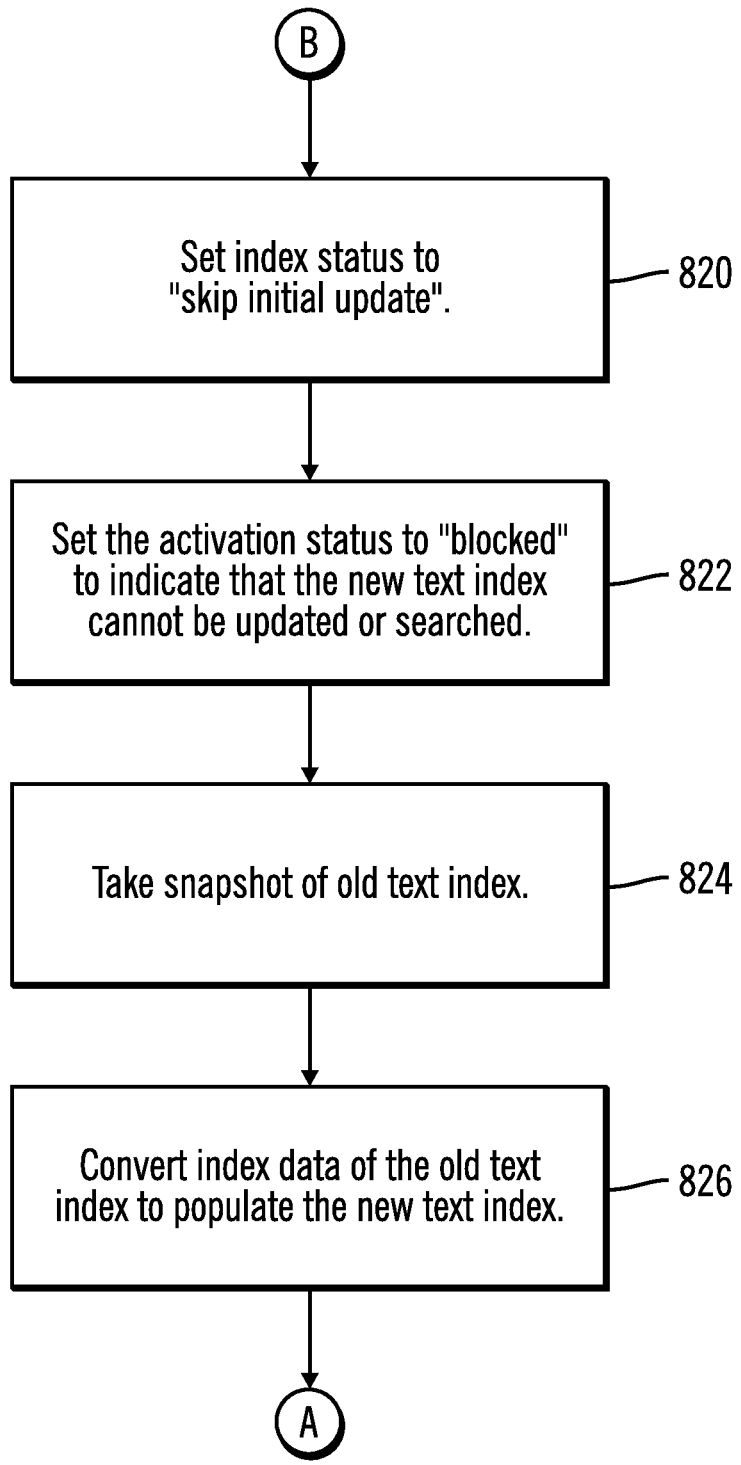

FIGS. 8A, 8B, and 8C illustrate, in a flow diagram, operations for re-indexing with an activation switch in accordance with certain embodiments. That, is there is a switch between using the old text index and the new text index. Control begins at block 800 with the TIU engine 120 receiving a request for re-indexing with an activation switch. In block 802, the TIU engine 120 creates a new text index. In block 804, the TIU engine 120 sets an activation status of the new text index to "update only" to indicate that the new text index may be updated but not searched. In block 806, the TIU engine 120 creates a log table for the new text index to capture changes to a table for which the new text index was created. In block 808, the TIU engine 120 determines whether re-indexing is to be performed. If so, processing continues to block 810, otherwise, processing continues to block 820 (FIG. 8C). In block 810, the TIU engine 120 performs an initial update. From block 810, processing continues to block 812 (FIG. 8B).

In block 812, the TIU engine 120 sets the activation status of the new text index to "active" to enable the new text index to be updated and searched. In block 814, the TIU engine 120 applies incremental updates. In block 816, the TIU engine 120 drops the old log table. In block 818, the TIU engine 120 drops the old text index. Then, the new text index and the log table for the new text index are used.

In block 820, the TIU engine 120 sets the index status to "skip initial update". In block 822, the TIU engine 120 sets the activation status of the new text index to "blocked" to indicate that the new text index cannot be updated or searched. In block 824, the TIU engine 120 takes a snapshot of the old text index. In block 826, the TIU engine 120 converts index data of the old text index to populate the new text index. In various embodiments, the conversion may involve direct mapping or document reconstruction.

An example of using embodiments is to perform migration from an index having a first structure to an index having a second structure by creating the new text index having the second structure. Embodiments provide a document retrieval system having stored items, including documents and information about the documents (metadata), with stored first text indices of the items used for searching the content. Embodiments enable migrating to an updated document retrieval system having updated text indices with a structure different than a structure of the first text indices. Embodiments perform: identifying an initial subset of the items; generating, in updating increments, updated text indices having updated structure, wherein the generating includes performing an initial one of the updating increments on the initial subset of the items; setting a key for respective ones of the items to indicate when an updated text index has been generated for the respective item; and providing, for a search, the updated text indices for ones of the items that have a key indicating an updated text index has been generated and the first text indices for ones of the items that have a key indicating no updated text index has been generated.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
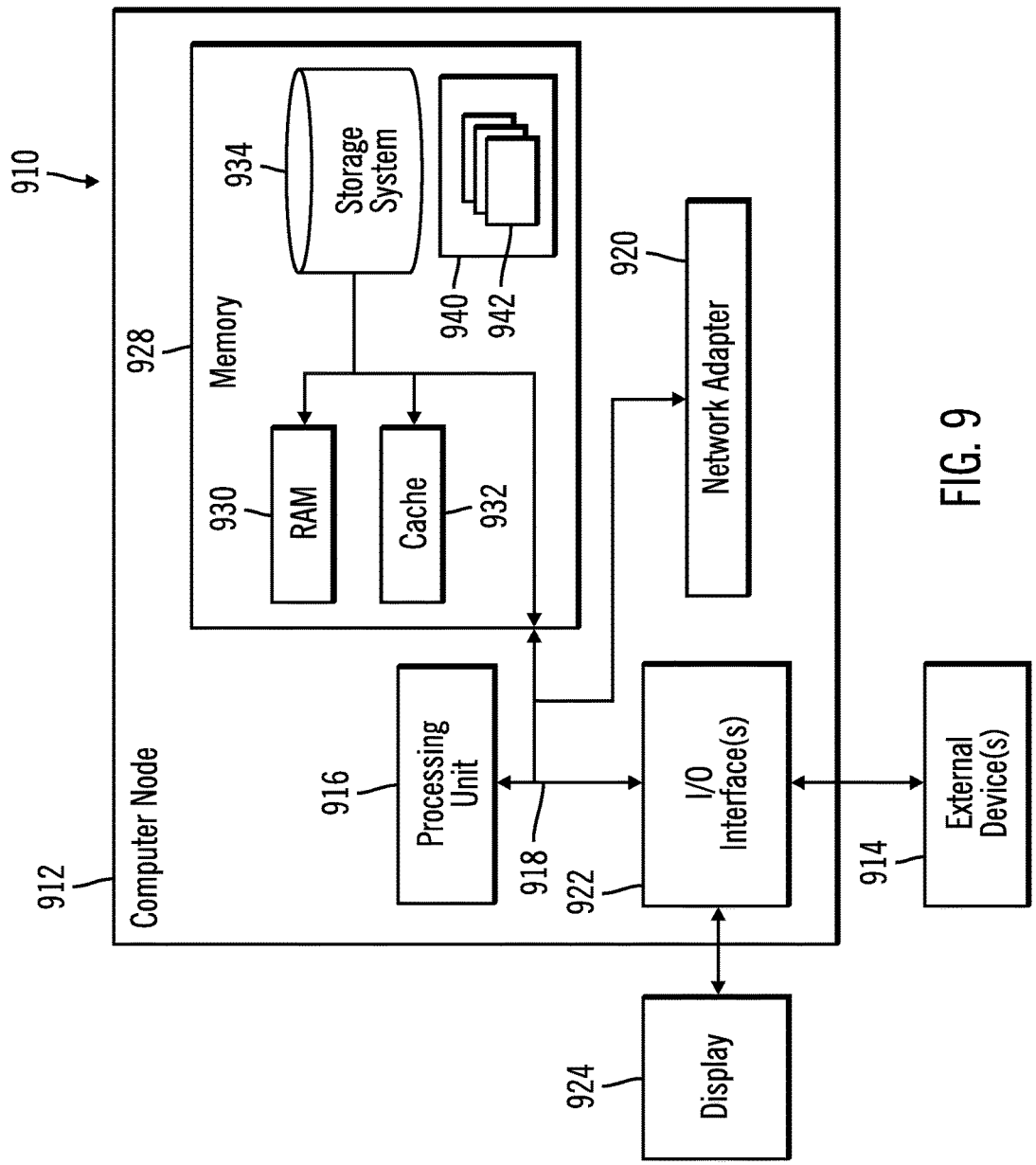
FIG. 9 illustrates a cloud computing node in accordance with certain embodiments.

Referring now to FIG. 9, a schematic of an example of a cloud computing node is shown. Cloud computing node 910 is only one example of a suitable cloud computing node and is not intended to suggest any limitation as to the scope of use or functionality of embodiments of the invention described herein. Regardless, cloud computing node 910 is capable of being implemented and/or performing any of the functionality set forth hereinabove.

In cloud computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Figure 10:
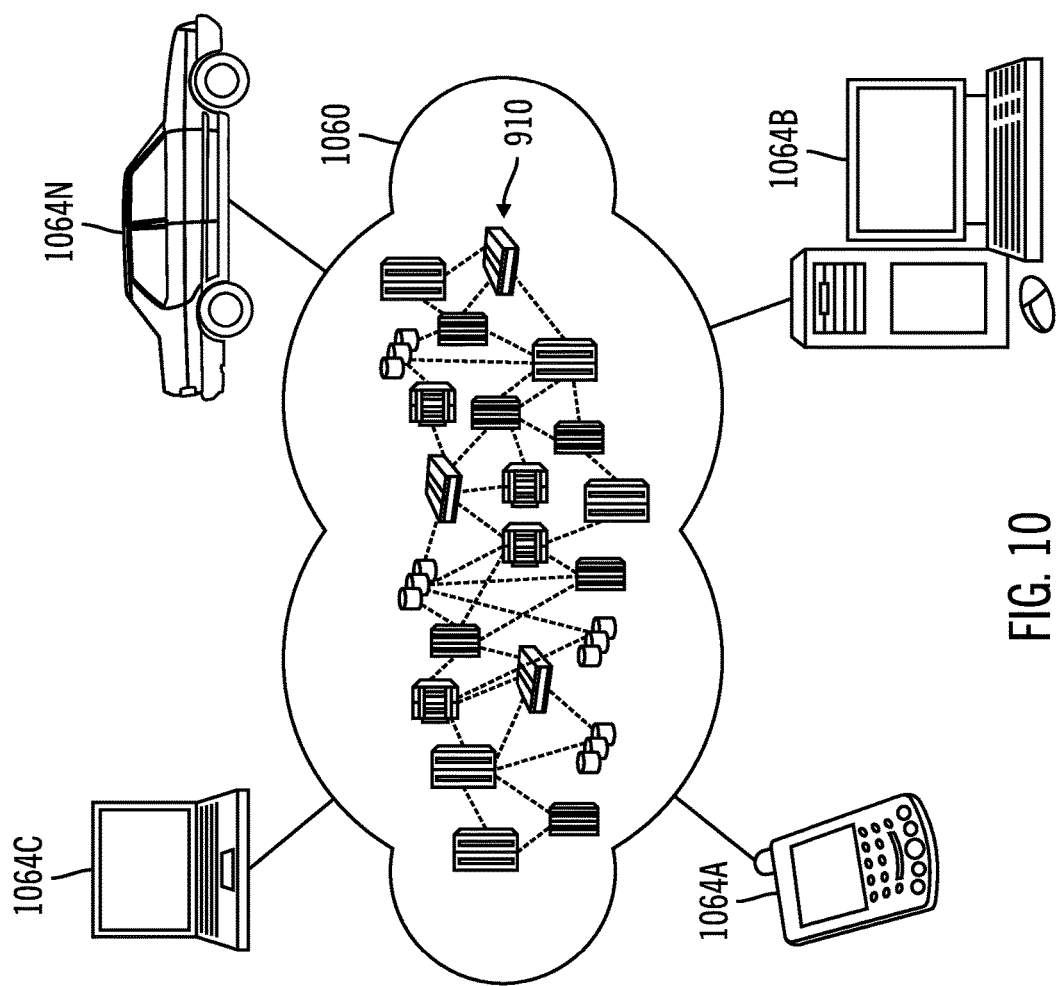
FIG. 10 illustrates a cloud computing environment in accordance with certain embodiments.

Referring now to FIG. 10, illustrative cloud computing environment 1050 is depicted. As shown, cloud computing environment 1050 comprises one or more cloud computing nodes 910 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 910 and cloud computing environment 1050 can communicate with any type of computerized device over any type of network and/or network addressable connection (e.g., using a web browser).

Figure 11:
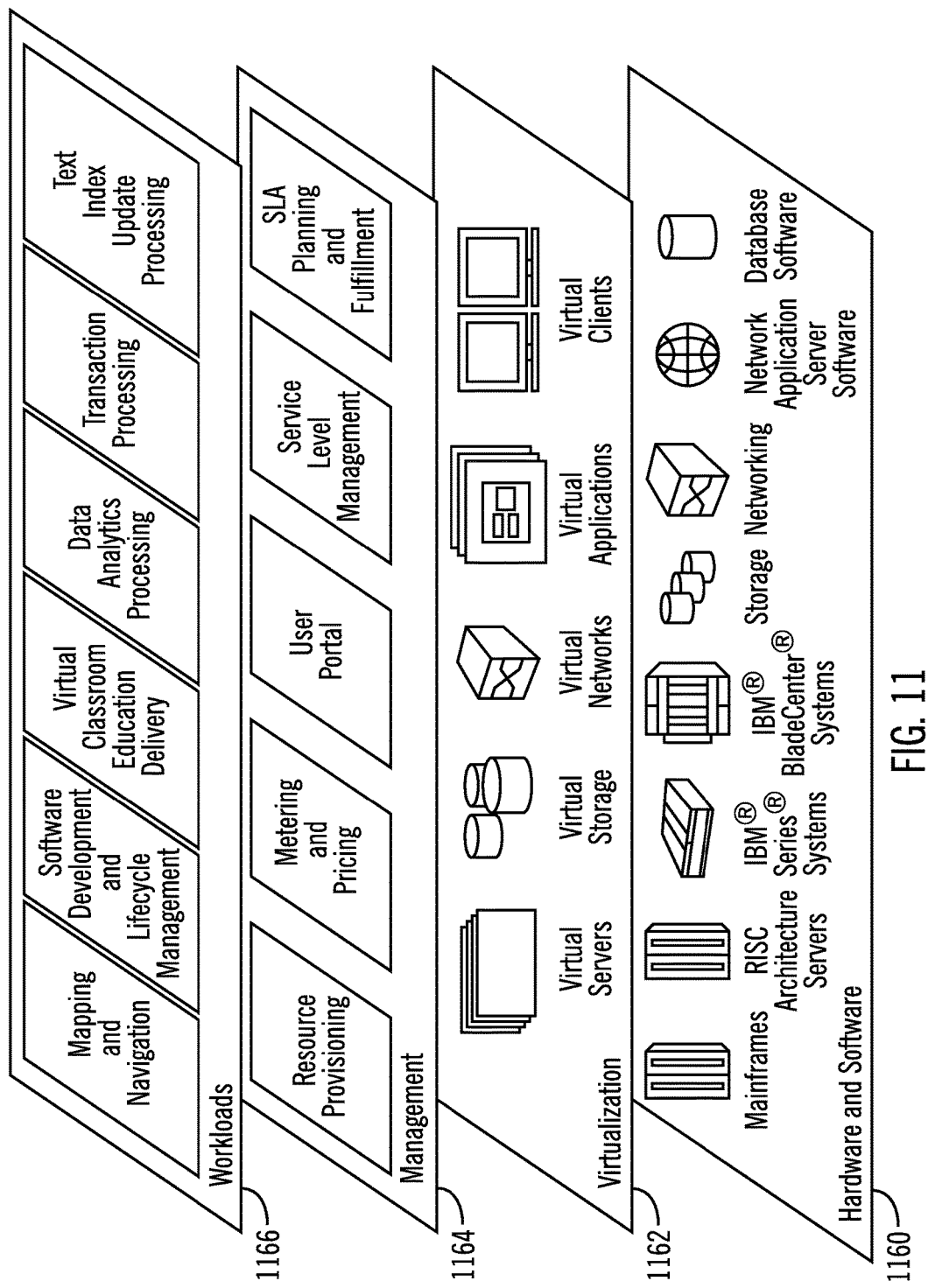
FIG. 11 illustrates abstraction model layers in accordance with certain embodiments.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1162 provides an abstraction layer from which the following examples of virtual entities may be provided: virtual servers; virtual storage; virtual networks, including virtual private networks; virtual applications and operating systems; and virtual clients.

In one example, management layer 1164 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1166 provides examples of functionality for which the cloud computing environment may be utilized. Examples of workloads and functions which may be provided from this layer include: mapping and navigation; software development and lifecycle management; virtual classroom education delivery; data analytics processing; transaction processing; and text index update processing.

Thus, in certain embodiments, software or a program, implementing text index update processing in accordance with embodiments described herein, is provided as a service in a cloud environment.

In certain embodiments, the server computer 100 has the architecture of computing node 910. In certain embodiments, the server computer 100 is part of a cloud environment. In certain alternative embodiments, the server computer 100 is not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer program product, the computer program product comprising a computer readable storage medium having program code embodied therewith, the program code executable by at least one processor to perform:
   storing, by the at least one processor, an old text index;
   creating, by the at least one processor, a new text index using a restart key that identifies a next document to be indexed in a next commit cycle;
   in response to determining that an insert operation for a new document is received, adding, by the at least one processor, the new document to the new text index;
   in response to determining that an update operation for a document in the old text index is received,
      updating, by the at least one processor, the document in the new text index; and
      removing, by the at least one processor, the document from the old text index;
   in response to determining that a search request includes a time range and the time range is less than a time of creation of the new text index, generating, by the at least one processor, a result using an old text index;
   in response to determining that the search request includes the time range and the time range is not less than the time of creation of the new text index, generating, by the at least one processor, the result using the new text index;
   in response to determining that the search request does not include the time range, generating, by the at least one processor, the result using both the old text index and the new text index; and
   returning, by the at least one processor, the result in response to the search request.

2. The computer program product of claim 1, wherein a limit for a commit cycle represents one of a number of documents that have been processed and an amount of time that has elapsed.

3. The computer program product of claim 1, wherein the program code is executable by the at least one processor to perform:
   re-indexing, by the at least one processor, documents from set of documents that have changed to the new text index.

4. The computer program product of claim 1, wherein a Software as a Service (SaaS) is configured to perform computer program product operations.

5. A computer system, comprising:
   one or more processors; and
   one or more computer-readable, tangible storage devices coupled to the one or more processors, wherein program instructions, stored on at least one of the one or more computer-readable, tangible storage devices are executed by at least one of the one or more processors, to perform operations, wherein the operations comprise:
   storing an old text index;
   creating a new text index using a restart key that identifies a next document to be indexed in a next commit cycle;
   in response to determining that an insert operation for a new document is received, adding the new document to the new text index;
   in response to determining that an update operation for a document in the old text index is received,
      updating the document in the new text index; and
      removing the document from the old text index;
   in response to determining that a search request includes a time range and the time range is less than a time of creation of the new text index, generating a result using an old text index;
   in response to determining that the search request includes the time range and the time range is not less than the time of creation of the new text index, generating the result using the new text index;
   in response to determining that the search request does not include the time range, generating the result using both the old text index and the new text index; and
   returning the result in response to the search request.

6. The computer system of claim 5, wherein a limit for a commit cycle represents one of a number of documents that have been processed and an amount of time that has elapsed.

7. The computer system of claim 5, wherein the operations further comprise:
   re-indexing documents from a set of documents that have changed to the new text index.

8. The computer system of claim 5, wherein a Software as a Service (SaaS) is configured to perform the operations.

* * * * *